US012572167B2

(12) United States Patent
Ling et al.

(10) Patent No.: US 12,572,167 B2
(45) Date of Patent: Mar. 10, 2026

(54) DISPLAY DEVICE AND PERIPHERAL COMPONENT INTERFACES

(71) Applicant: Lenovo (Beijing) Limited, Beijing (CN)

(72) Inventors: Riyi Ling, Beijing (CN); Huijun Qin, Beijing (CN); Hsiang-I Chen, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 196 days.

(21) Appl. No.: 18/145,505

(22) Filed: Dec. 22, 2022

(65) Prior Publication Data

US 2023/0205260 A1 Jun. 29, 2023

(30) Foreign Application Priority Data

Dec. 22, 2021 (CN) .......................... 202111583289.0

(51) Int. Cl.
*G06F 1/16* (2006.01)
*G06F 13/42* (2006.01)

(52) U.S. Cl.
CPC ........ *G06F 1/1607* (2013.01); *G06F 13/4282* (2013.01); *G06F 2213/0042* (2013.01)

(58) Field of Classification Search
CPC .............. G06F 1/1607; G06F 13/4282; G06F 2213/0042; H04N 23/51; H04N 23/53; H04N 23/531
See application file for complete search history.

(56) References Cited

U.S. PATENT DOCUMENTS

| 10,955,873 B1 * | 3/2021 | Godfrey | ................ G06F 1/1607 |
| 2005/0231587 A1 * | 10/2005 | Root | ........................ H04R 5/02 |
| | | | 381/431 |
| 2009/0257201 A1 * | 10/2009 | Burge | .................. F16M 11/105 |
| | | | 361/825 |
| 2012/0120581 A1 * | 5/2012 | Haren | ................... G06F 1/1632 |
| | | | 361/679.21 |

(Continued)

FOREIGN PATENT DOCUMENTS

| CN | 110557467 A | * 12/2019 | .......... H04M 1/0264 |
| CN | 112770155 A | * 5/2021 | ......... H04N 21/4104 |

OTHER PUBLICATIONS

CN112770155-A Machine Translation (Year: 2025).*
CN110557467-A Machine Translation (Year: 2025).*
Machine Translation of CN110557467A (Year: 2025).*

*Primary Examiner* — Sagar Shrestha
*Assistant Examiner* — Peter Krim
(74) *Attorney, Agent, or Firm* — ANOVA LAW GROUP, PLLC

(57) ABSTRACT

A display system includes a housing, a display device provided at the housing and exposed from a first side of the housing, a first interface provided at a second side of the housing different from the first side of the housing, and configured to transmit data, and an interaction device. The interaction device includes an interaction member configured to respond to and/or generate interaction data, and a second interface configured to be detachably connected to the first interface and transmit the data. After the second interface is connected to the first interface, the interaction device is configured to maintain a positional relationship with the display device.

19 Claims, 16 Drawing Sheets

100

(56)　　　　　　References Cited

U.S. PATENT DOCUMENTS

| | | | |
|---|---|---|---|
| 2016/0037910 A1* | 2/2016 | Ergun ................. | A47B 23/043 |
| | | | 211/26 |
| 2017/0244903 A1* | 8/2017 | Yang ................... | H04N 23/631 |

* cited by examiner

100

100

100

100

100

100

100

DISPLAY DEVICE AND PERIPHERAL COMPONENT INTERFACES

CROSS-REFERENCE TO RELATED APPLICATION

The present application claims priority to Chinese Patent Application No. 202111583289.0, filed Dec. 22, 2021, the entire content of which is incorporated herein by reference.

TECHNICAL FIELD

The present disclosure relates to the field of electronic device technology and, in particular, to a display system.

BACKGROUND

A display system is an output device, which can display images and information.

In the existing technology, after the display system is connected to an external device, the external device can move relative to the display system, resulting in occupying a large space and inconvenient movement for the display system and the external device as a whole.

SUMMARY

In accordance with the disclosure, there is provided a display system including a housing, a display device provided at the housing and exposed from a first side of the housing, a first interface provided at a second side of the housing different from the first side of the housing, and configured to transmit data, and an interaction device. The interaction device includes an interaction member configured to respond to and/or generate interaction data, and a second interface configured to be detachably connected to the first interface and transmit the data. After the second interface is connected to the first interface, the interaction device is configured to maintain a positional relationship with the display device

Figure 1A:
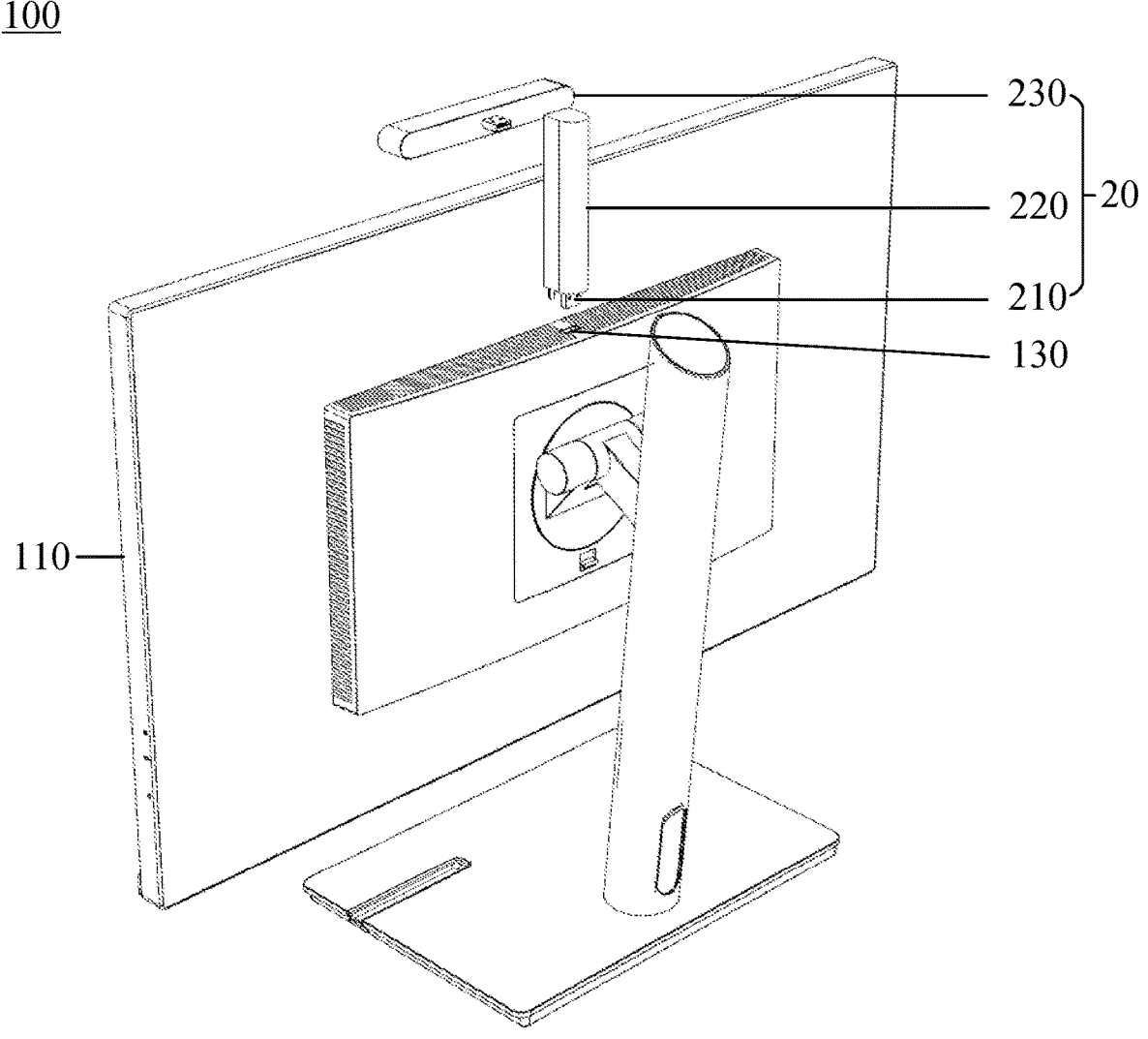
FIG. 1A is an exploded schematic diagram of a display system according to an embodiment of the disclosure.

Reference numerals: Display system 100; Housing 110; Display device 120; First interface 130; Protrusion structure 140; Interaction device 20; Second interface 210; Support member 220; First interaction member 230; Second interaction member 240; Support leg 241; Third interaction member 250; Second guiding structure 260.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

It should be noted that, in FIGS. 1A-11C, a first interaction member 230 is illustrated by a camera with a lens, and a second interaction member 240 is illustrated by a speaker.

As shown in FIGS. 1-11C, a display system 100 consistent with the embodiments of the present disclosure is provided. The display system 100 includes a housing 110, a display device 120, a first interface 130, and an interaction device 20. The display device 120 is provided at the housing 110 and exposed from a first side of the housing 110. The first interface 130 is provided at a second side of the housing 110 different from the first side of the housing. The first interface 130 is used to transmit data. The interaction device 20 includes at least one interaction member and a second interface 210. The interaction member is used to respond to and/or generate interaction data. The second interface 210 can be detachably connected to the first interface 130. The second interface 210 is used to transmit the data. After the first interface 130 is connected to the second interface 210, the interaction device 20 as a whole can maintain a positional relationship with the display device 120.

Figure 1B:
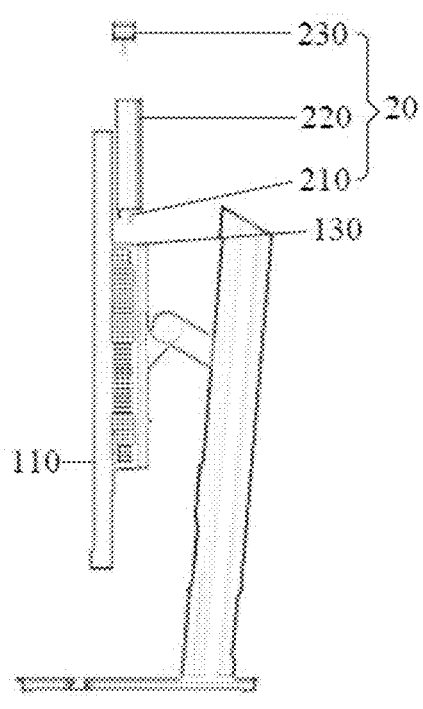
FIG. 1B is an exploded schematic diagram of the display system according to the embodiment of the disclosure.
Figure 1C:
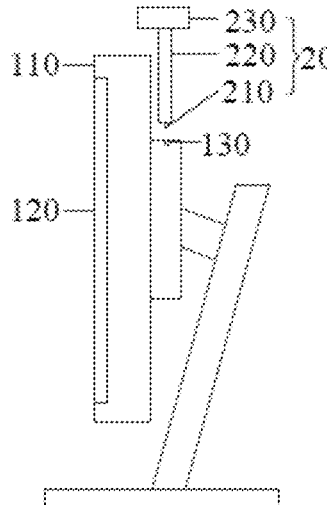
FIG. 1C is an exploded schematic diagram of the display system according to the embodiment of the disclosure.
Figure 1D:
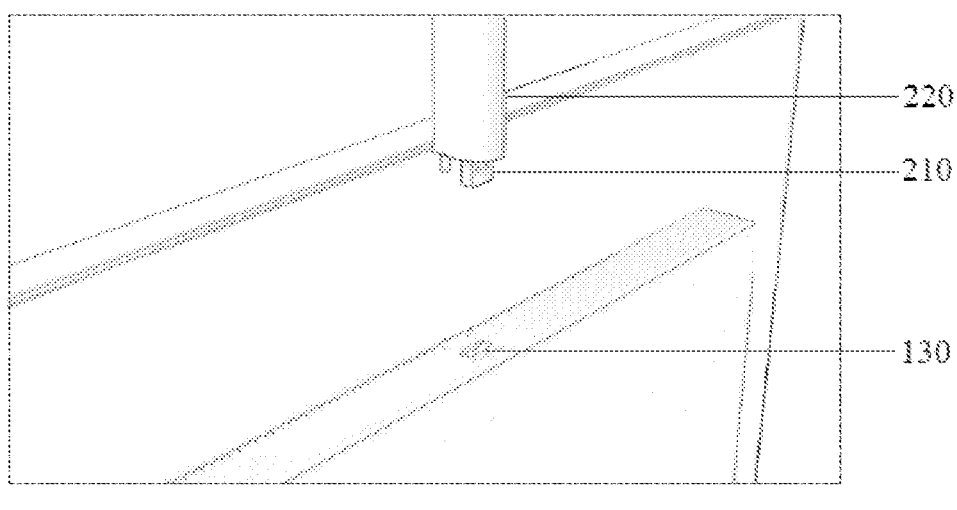
FIG. 1D is a partial exploded schematic diagram of the display system according to the embodiment of the disclosure.
Figure 2A:
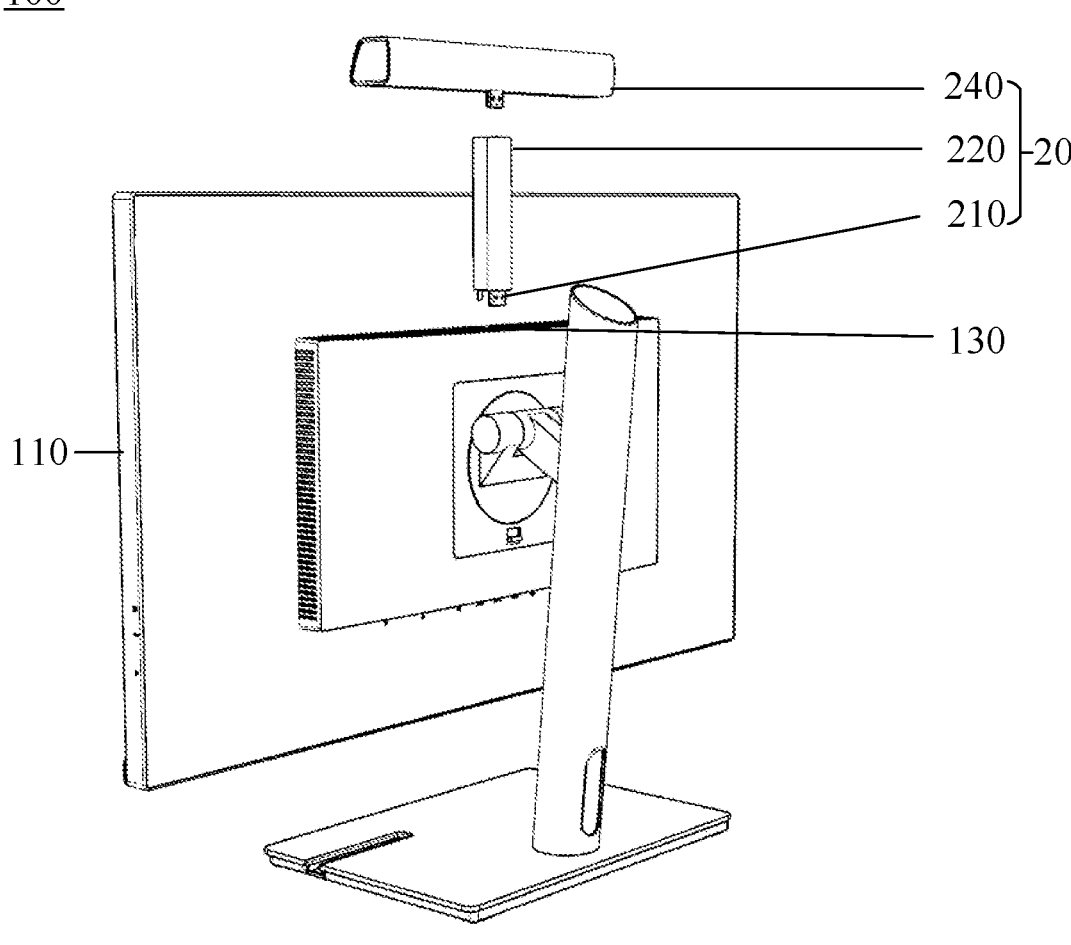
FIG. 2A is an exploded schematic diagram of a display system according to another embodiment of the disclosure.
Figure 2B:
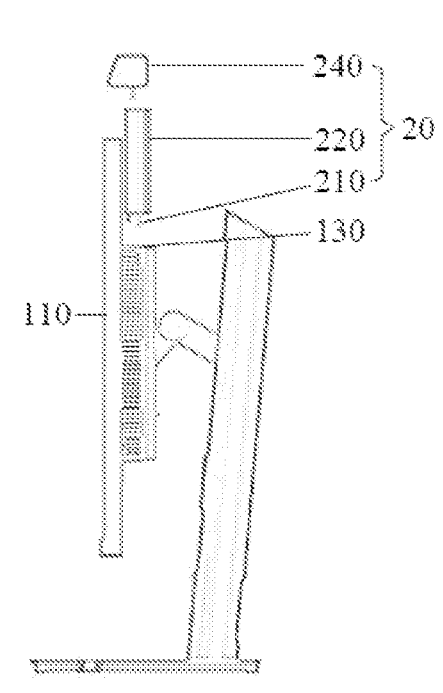
FIG. 2B is an exploded schematic diagram of the display system according to another embodiment of the disclosure.

The housing 110 may have a plurality of sides, for example, as shown in FIGS. 1A-1C, the housing 110 has 6 sides and is in a shape of a cuboid.

The display device 120 is disposed at the housing 110 and exposed from the first side of the housing 110. The display device 120 may be disposed at the housing 110 and at least partially exposed from the first side of the housing 110. For example, the housing 110 has 6 sides and is in the shape of a cuboid, and the display device 120 is disposed at one side of the 6 sides and at least partially exposed from the one side. The display device 120 is used for outputting display content.

The first interface 130 is provided at the second side of the housing 110 that is different from the first side. That is, the side where the first interface 130 is disposed at and the side where the display device 120 is exposed from the housing 110 are different. For example, as shown in FIG. 1C, the display device 120 is exposed from the first side of the housing 110, and the first interface 130 is disposed at a protrusion structure 140 at the second side of the housing 110. The protrusion structure 140 can be provided with a heat dissipation member for cooling the display system 100, and other structural members. The second side of the housing is opposite to the first side of the housing. The first interface 130 is used to transmit the data including data input or data output.

The second interface 210 can be detachably connected with the first interface 130. That is, the second interface 210 can be connected to the first interface 130 to realize an electrical connection between the interaction device 20 and the display device 120. The second interface 210 can be disconnected from the first interface 130 to cause the interaction device 20 to be detached from the first interface 130. The second interface 210 may include a USB interface or another interface, which is not limited here. Both the second interface 210 and the first interface 130 are used to transmit the data to cause the interaction device 20 and the display device 120 to transmit the data with each other after the second interface 210 is connected to the first interface 130.

The interaction members may include a speaker with an amplifying function, an earphone with a sound outputting function, a lens assembly with an imaging function, a printer with a printing function, a fan blade that can blow air, a light-emitting member that can emit light, or a member with another function, which is not limited here. In response to the interaction member including a plurality of interaction members, the functions of the plurality of interaction members may not be the same. When the functions of the two interaction members are the same, orientations or angles of the two interaction members may be different. The interaction members are used to respond to and/or generate the interaction data. That is, the interaction members may be used to respond to the interaction data, or may be used to generate the interaction data, or may be used to respond to and generate the interaction data. For example, when the interaction member includes the speaker with the amplifying function, the speaker receives audio data from the first interface 130 via the second interface 210 and then broadcasts the audio data. That is, the speaker is used to respond to the interaction data. For another example, when the interaction member includes the lens assembly with the imaging function, image information collected by the lens assembly can be transmitted to the first interface 130 via the second interface 210. That is, the lens assembly can generate the interaction data.

After the first interface 130 is connected to the second interface 210, the interaction device 20 as a whole can maintain the positional relationship with the display device 120. For example, after the first interface 130 is connected to the second interface 210, a position on the interaction device 20 is fixed at a position at the housing 110.

In an example embodiment, a number of interaction member is one. The interaction member includes the speaker. The speaker is provided with the second interface 210. The speaker can be connected to the first interface 130 of the housing 110 and play audio.

The function of the display device can be expanded through the interaction device. After the first interface and the second interface are connected, the interaction device as a whole can maintain the positional relationship with the display device, so that the interaction device occupies a smaller space and easy to be moved with the display device. The interaction device can be disconnected from the first interface through the second interface, so that the interaction device can be detached from the first interface for replacement, maintenance, and cleaning.

In some embodiments, the first interface 130 can include a positive and negative plug-in interface. For example, the first interface 130 can include a TYPE-C interface, so that the second interface 210 can be connected to the first interface 130 in a forward direction as well as being connected to the first interface 130 in a reverse direction. The first interface 130 can include a rotatable interface, so that the first interface 130 can be rotated according to the direction of the second interface 210 to realize the connection between the two.

To prevent the first interface 130 from entering dust and other debris after the interaction device 20 is detached, the display system 100 may be provided with a first cover. The first cover is used to cover the first interface 130. The first cover can be opened when the first interface 130 is connected to the second interface 210. For example, the first cover may be rotatably connected to the housing 110. The first cover may be slidably connected to the housing 110.

In some embodiments, as shown in FIGS. 1A-1C, the housing 110 has the second side. The second side is opposite to the first side. The first interface 130 is arranged at the second side. The display device 120 faces a first direction to display content. An orientation of the first interface 130 is a second direction. The second direction is perpendicular to the first direction. The at least one interaction member is not overlapped with the display device 120 in the first direction.

The housing 110 has the second side. The second side is opposite to the first side. For example, the second side may be partially opposite to the entire first side. The entire second side may be opposite to a part of the first side. As shown in FIG. 1C, the entire second side is opposite the entire first side. The second direction is perpendicular to the first direction. For example, an angle between the first direction and the second direction may be 90 degrees, or may be approximately 90 degrees. For example, the angle between the first direction and the second direction is 89 degrees. At least one interaction member is not overlapped with the display device 120 in the first direction. That is, an orthographic projection of the at least one interaction member along the first direction is not overlapped with an orthographic projection of the display device 120 along the first direction. For example, a part or all of the at least one interaction member protrudes from the housing 110 at a side of the display device 120.

By arranging the display device and the first interface on two opposite sides of the housing, a visual effect of a using angle of a user can be improved. The orientation of the first interface and the output direction of the display device are perpendicular to each other, so that a combination of the interaction device, the display device, and the housing achieves a better visual effect and occupies a smaller space.

In some embodiments, as shown in FIGS. 1A-1D and 3A-3D, the interaction device 20 includes a support member 220 and a first interaction member 230. The support member 220 is provided with a second interface 210 and a third interface. The first interaction member 230 is provided with a fourth interface. The fourth interface can be detachably connected to the third interface. The first interaction member 230 is not overlapped with the display device 120 in the first direction.

The support member 220 is provided with the second interface 210 and the third interface. The second interface 210 may have a same or different structure as the third interface.

The first interaction member 230 has at least a first function. The first function includes an imaging function. For example, the first interaction member 230 has an imaging function and a lighting function at the same time. The first interaction member 230 is provided with the fourth interface. The fourth interface may be same as or different from the second interface 210. The fourth interface can be detachably connected with the third interface. That is, the first interaction member 230 and the support member 220 may be disconnected with each other or connected with each other. The first interaction member 230 is not overlapped with the display device 120 in the first direction. That is, an orthographic projection of the first interaction member 230 along the first direction is not overlapped with the orthographic projection of the display device 120 along the first direction. For example, the first interaction member 230 is supported by the support member 220 to cause a part or all of the first interaction member 230 to protrude from the housing 110 at a side of the display device 120.

In some embodiments, the display device is extended with at least an imaging function through the first interaction member. The first interaction member can be supported at the housing by the support member. Because the support member and the housing can be disconnected, the first interaction member and the support member can be disconnected, and the first interaction member can be supported at different positions by the support members with different sizes, the user can select different sizes of support members according to the needs and the size of housing. The first interaction member and the support member can be disconnected, so that the first interaction member can be moved to a second display system or be removed for replacement, maintenance, or cleaning.

In some embodiments, as shown in FIGS. 2A, 2B, 4A, and 4B, the interaction device 20 includes the support member 220 and a second interaction member 240. The support member 220 is provided with the second interface 210. The second interaction member 240 can be detachably connected to the support member 220. The second interaction member 240 is not overlapped with the display device 120 in the first direction.

The second interaction member 240 at least has a second function. The second function includes an audio playing function. The interaction device 20 also includes the support member 220 and a third interaction member 250. The third interaction member 250 has a third function. The third function is different from the first function and the second function. The second interaction member 240 is not overlapped with the display device 120 in the first direction. In other words, an orthographic projection of the second interaction member 240 along the first direction is not overlapped with the orthographic projection of the display device 120 along the first direction.

In some embodiments, the first interaction member 230 is provided with one or more support legs, so that the first interaction member 230 can be disassembled and used independently. For example, the first interaction member 230 is a speaker with the amplifying function.

Figure 3A:
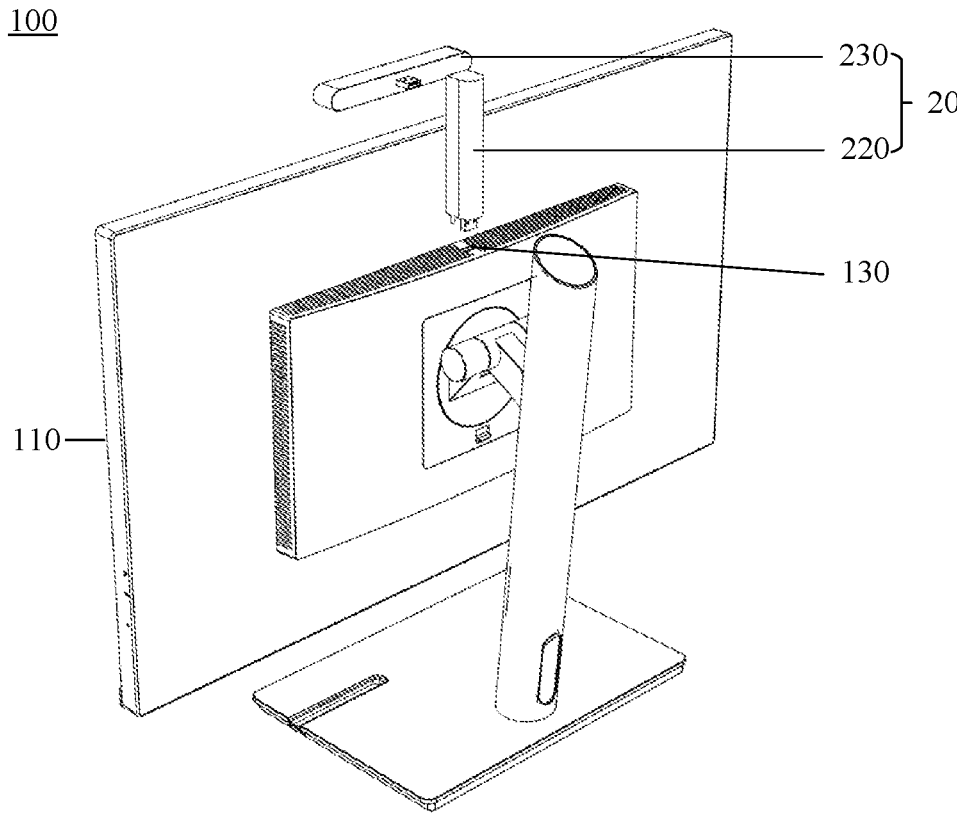
FIG. 3A is an exploded schematic diagram of a display system according to another embodiment of the disclosure.
Figure 3B:
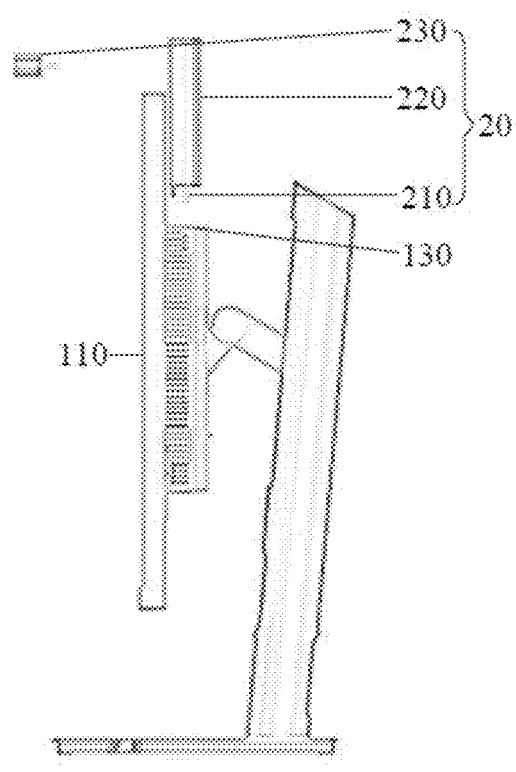
FIG. 3B is an exploded schematic diagram of the display system according to another embodiment of the disclosure.
Figure 3C:
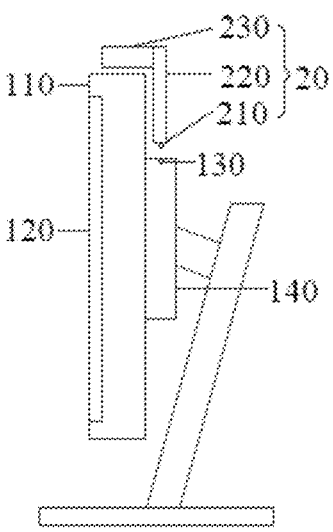
FIG. 3C is an exploded schematic diagram of the display system according to another embodiment of the disclosure.
Figure 3D:
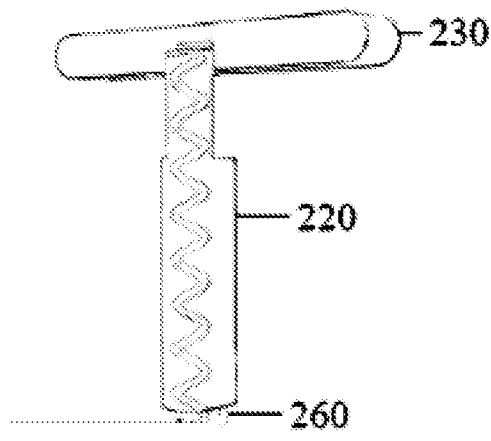
FIG. 3D is a schematic structural diagram of an interaction device of the display system according to another embodiment of the disclosure.
Figure 4A:
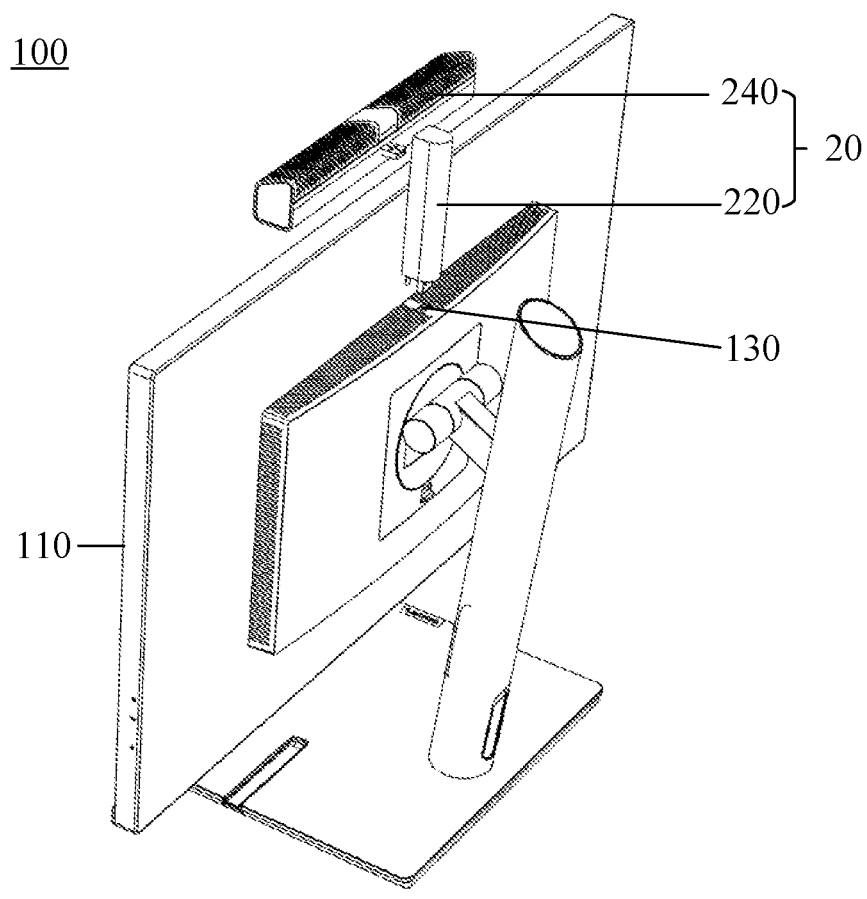
FIG. 4A is an exploded schematic diagram of a display system according to another embodiment of the disclosure.
Figure 4B:
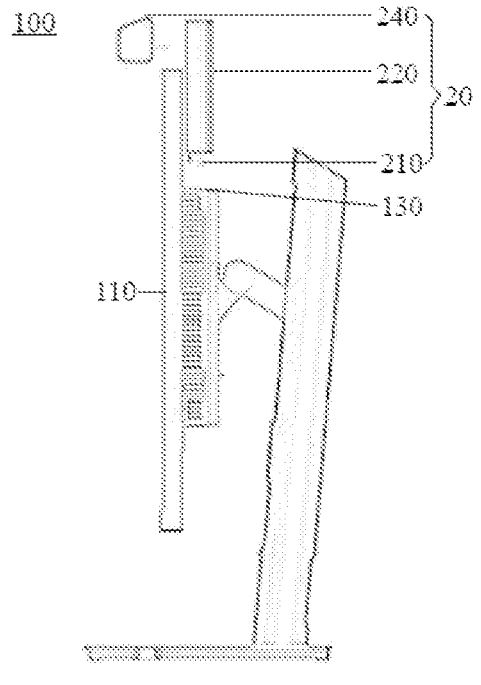
FIG. 4B is an exploded schematic diagram of the display system according to another embodiment of the disclosure.
Figure 5A:
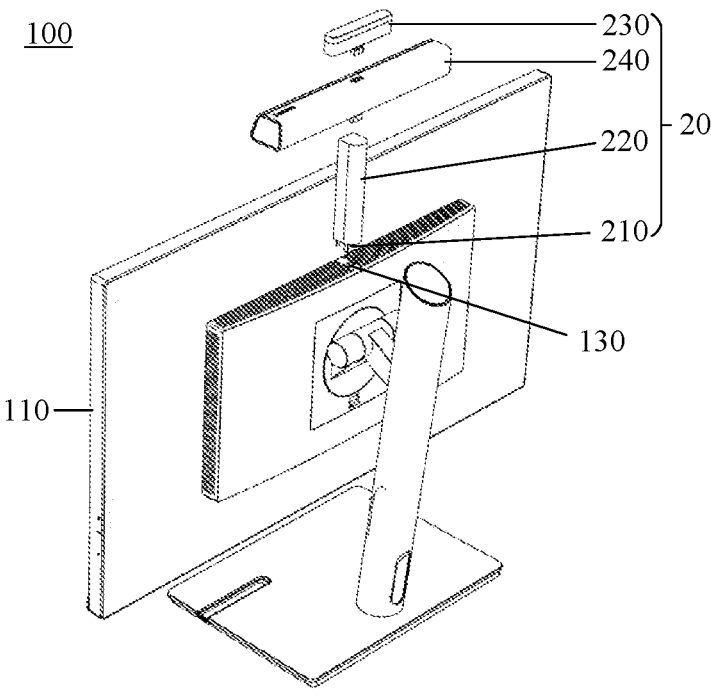
FIG. 5A is an exploded schematic diagram of a display system according to another embodiment of the disclosure.
Figure 5B:
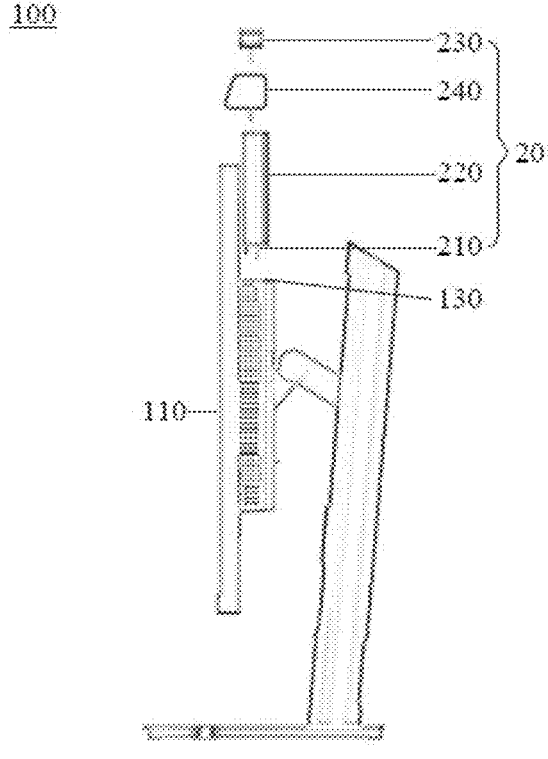
FIG. 5B is an exploded schematic diagram of the display system according to another embodiment of the disclosure.
Figure 5C:
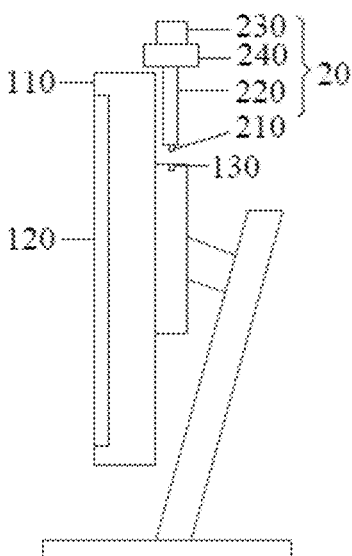
FIG. 5C is an exploded schematic diagram of the display system according to another embodiment of the disclosure.
Figures 6A, 6B:
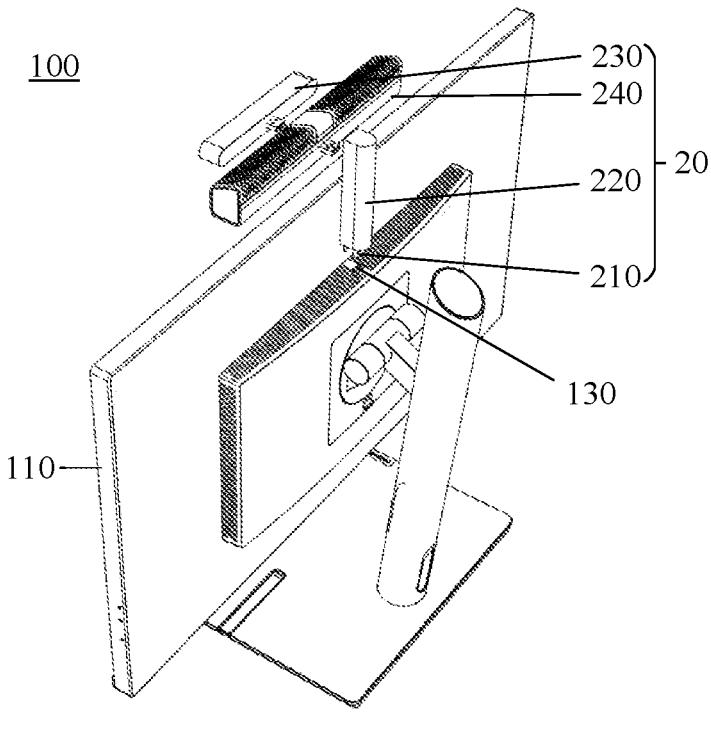
FIG. 6A is an exploded schematic diagram of a display system according to another embodiment of the disclosure.
FIG. 6B is an exploded schematic diagram of the display system according to another embodiment of the disclosure.
Figure 6C:
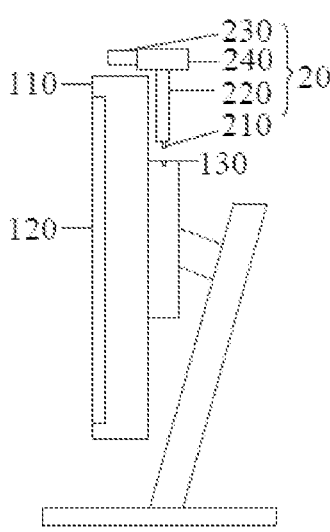
FIG. 6C is an exploded schematic diagram of the display system according to another embodiment of the disclosure.
Figure 7A:
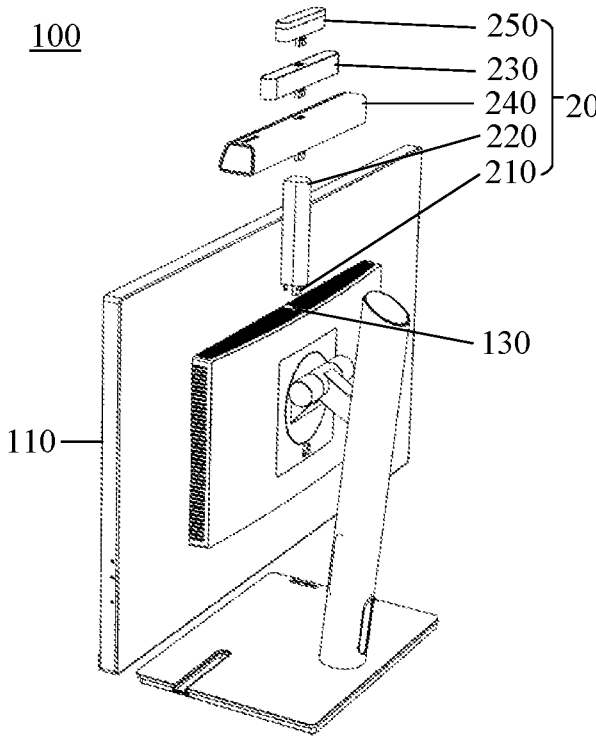
FIG. 7A is an exploded schematic diagram of a display system according to another embodiment of the disclosure.
Figure 7B:
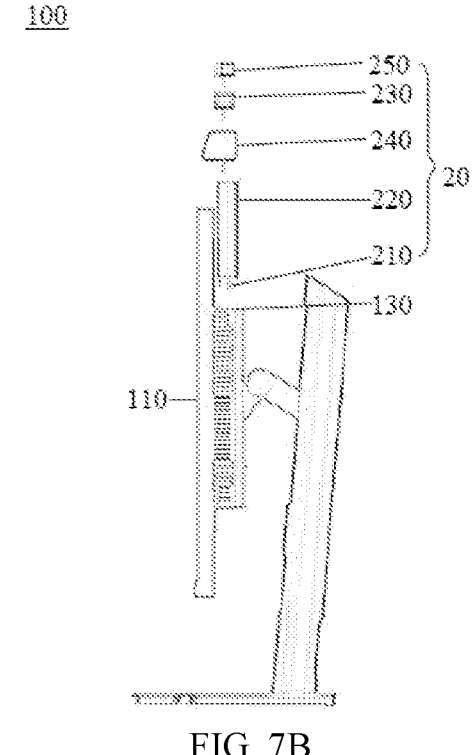
FIG. 7B is an exploded schematic diagram of the display system according to another embodiment of the disclosure.
Figure 8A:
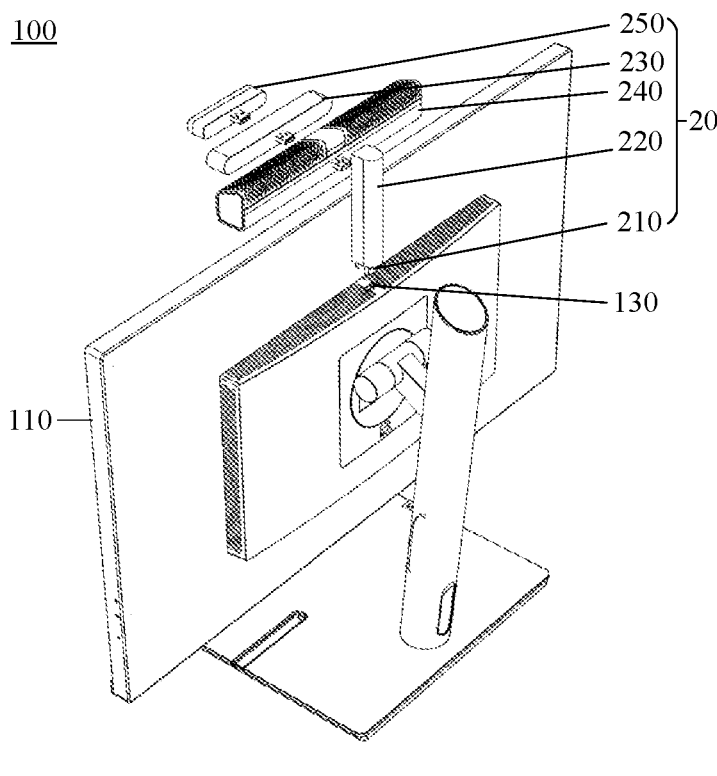
FIG. 8A is an exploded schematic diagram of a display system according to another embodiment of the disclosure.
Figure 8B:
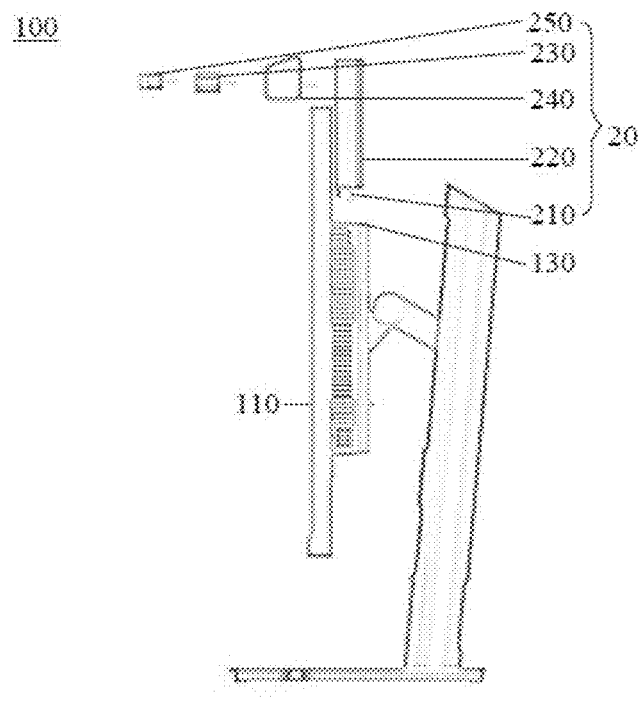
FIG. 8B is an exploded schematic diagram of the display system according to another embodiment of the disclosure.

In some embodiments, as shown in FIG. 3D, the interaction device 20 includes the first interaction member 230 and the support member 220. The support member 220 is used to adjust a distance between the first interaction member 230 and the first interface 130 along the second direction.

The support member 220 can be used to adjust the distance between the first interaction member 230 and the first interface 130 in the second direction. For example, the support member 220 is a retractable structure, so that a size of the support member 220 can be adjusted according to the needs of the user, and the support member 220 does not need to be replaced. The support member 220 is used to adjust the distance between the first interaction member 230 and the first interface 130 in the second direction, to adjust a position of the first interaction member 230 to adapt to different sizes of housings. The second interface 210 may be provided at the support member 220, or may be provided at the first interaction member 230.

In some embodiments, as shown in FIG. 3D, the support member 220 is a hollow structure. The support member 220 includes a movable member arranged therein. The movable member is capable of rising or falling relative to the support member 220. The first interaction member 230 is connected to the movable member, so that the distance between the first interaction member 230 and the first interface 130 in the second direction can be adjusted through the support member 220. The support member 220 is provided with the second interface 210 and the third interface connected with the first interaction member 230. A cable is located in the support member 220. Two ends of the cable are connected to the second interface 210 and the third interface, respectively. The cable is helical in the support member 220. The cable is stretched when the first interaction member 230 is raised.

In some embodiments, as shown in FIGS. 5A-6C, the first interaction member 230 is further provided with a fifth interface. The interaction device 20 further includes the second interaction member 240. The second interaction member 240 is provided with a sixth interface. The sixth interface can be detachably connected to the fifth interface. The second interaction member 240 is not overlapped with the display device 120 in the first direction.

The interaction device 20 is provided with the second interaction member 240 in addition to the first interaction member 230. The second interaction member 240 may have at least the second function. For example, the second inter-action member 240 has a sound amplification function and a wind outlet function. An orientation of the fifth interface may be parallel or approximately parallel to the first direc-tion, or may be parallel or approximately parallel to the second direction. the approximately parallel refers to that an extension direction of one of the two structures is slightly inclined with respect to an extension direction of the other structure. The sixth interface at the second interaction mem-ber 240 can be detachably connected to the fifth interface, to cause the second interaction member 240 to be detachably connected to the first interaction member 230. The second interaction member 240 is not overlapped with the display device 120 in the first direction. That is, the orthographic projection of the second interaction member 240 along the first direction is not overlapped with the orthographic pro-jection of the display device 120 along the first direction. For example, a part or all of the second intersection member 240 protrudes from the housing 110 at a side of the display device 120.

In some embodiments, the functions of the display device can be further enriched by adding the second interaction member.

As shown in FIGS. 7A-8B, the interaction device 20 includes the first interaction member 230, the second inter-action member 240, and the third interaction member 250. The third interaction member 250 may have a function same as or different from one or both of the first interaction member 230 and the second interaction member 240.

Figure 9:
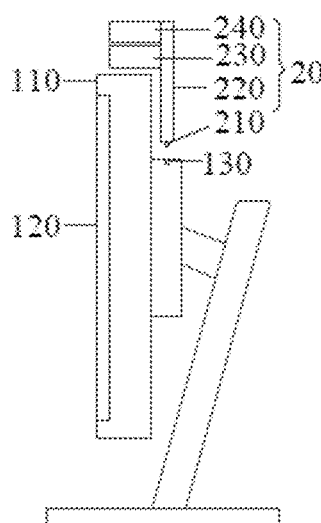
FIG. 9 is an exploded schematic diagram of the display system according to another embodiment of the disclosure.
Figure 10A:
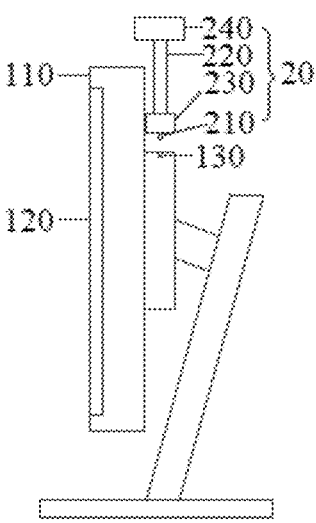
FIG. 10A is an exploded schematic diagram of a display system according to another embodiment of the disclosure.
Figure 10B:
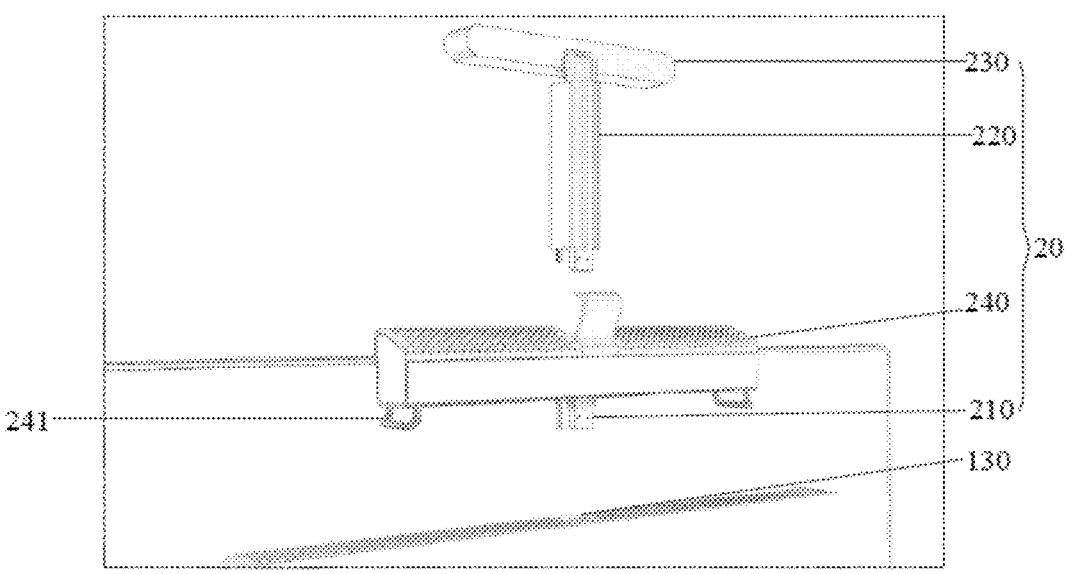
FIG. 10B is a partial exploded schematic diagram of the display system according to another embodiment of the disclosure.
Figure 10C:
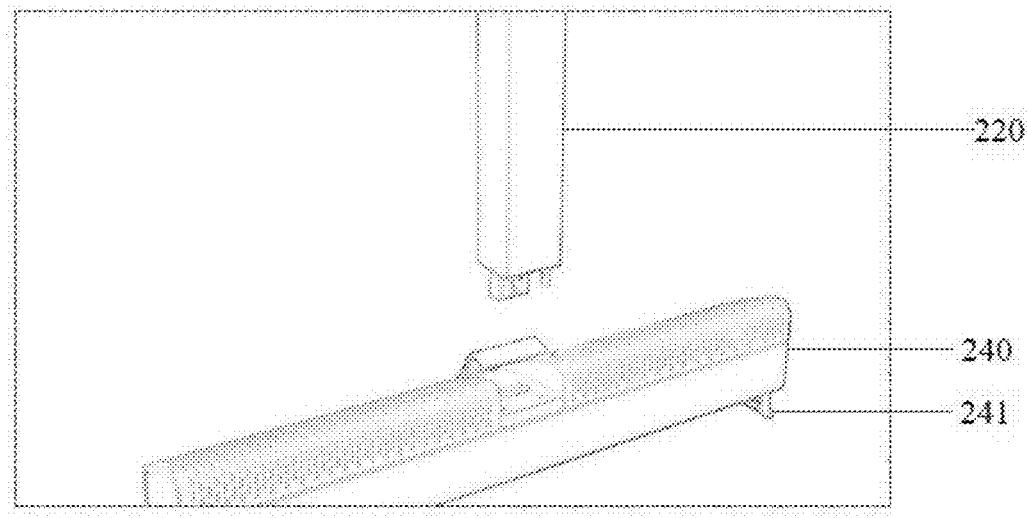
FIG. 10C is a partial exploded schematic diagram of the display system according to another embodiment of the disclosure.
Figure 10D:
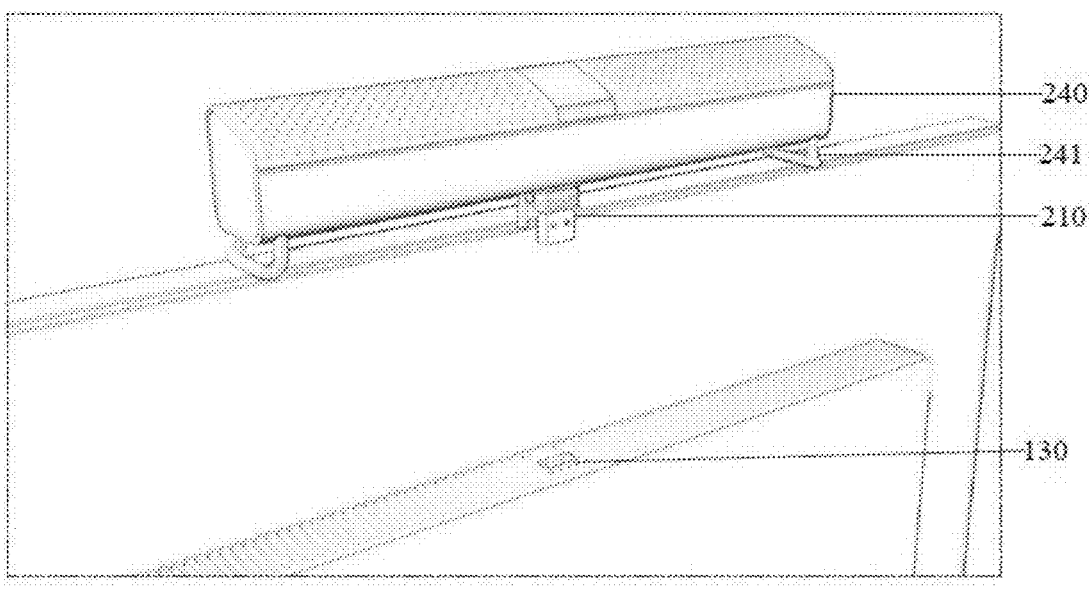
FIG. 10D is a partial exploded schematic diagram of the display system according to another embodiment of the disclosure.

In some embodiments, as shown in FIG. 9, the interaction device 20 includes the first interaction member 230 and the second interaction member 240. The first interaction mem-ber 230 and the second interaction member 240 may be respectively connected to the support member 220 con-nected to the first interface 130.

In some embodiments, as shown in FIGS. 10A-10D, the support member 220 is provided with a seventh interface. The interaction device 20 includes the second interaction member 240. The second interaction member 240 is pro-vided with the second interface 210 and an eighth interface. The eighth interface can be detachably connected to the seventh interface.

The interaction device 20 may be provided with the second interaction member 240 in addition to the first interaction member 230. The second interaction member 240 has at least the second function. The second function is a speaker function. The second interaction member 240 is detachable connected to the first interface 130. The second interaction member 240 is detachable connected to the support member 220. The support member 220 can be fixed or detachable connected to the first interaction member 230. The second interaction member 240 can be overlapped with the display device 120 in the first direction. That is, a part or all of the second interaction member 240 in the first direction is overlapped with the display device 120. For example, the orthographic projection of the second interaction member 240 in the first direction is located in the orthographic projection of the display device 120 in the first direction, so that the visual effect on the user side is better. The second interaction member 240 may be provided with two support-ing legs 241 opposite to each other, to enable the second interaction member 240 can be used independently after the second interaction member 240 is disassembled. For example, the second interaction member 240 is a speaker. The support legs 241 enable the second interaction member 240 to be placed on a desktop for independent use. When the second interaction member 240 is disassembled and used as an independent speaker, the eighth interface of the second interaction member 240 is provided with a second cover connected to the second interaction device 240. The second cover can cover or uncover the eighth interface.

In some embodiments, as shown in FIGS. 1A-4B and 9, the interaction device 20 includes the support member 220, the first interaction member 230, and the second interaction member 240. The support member 220 is provided with a ninth interface. The first interaction member 230 is provided with a tenth interface. The tenth interface can be detachably connected to the ninth interface to cause the first interaction member 230 to be connected to the support member 220. The second interaction member 240 is provided with an eleventh interface and a twelfth interface. The eleventh interface can be detachably connected to the ninth interface to cause the second interaction member 240 to be connected to the support member 220. The twelfth interface is detach-ably connected to the tenth interface to cause the second interaction member 240 to be connected to the first interac-tion member 230.

The second interface 210 of the interaction device 20 may be provided at the support member 220, the first interaction member 230, or the second interaction member 240. The first interaction member 230 can be connected to the support member 220. The second interaction member 240 can be connected to the support member 220 or the first interaction member 230, thereby enabling the user to select different combination. For example, the first interaction member 230 connected with the support member 220 can be disas-sembled and replaced with the second interaction member 240. The second interaction member 240 connected to the support member 220 can also be disassembled and replaced with the first interaction member 230.

In some embodiments, as shown in FIG. 3D, the display system 100 further includes a first guiding structure and a second guiding structure 260. The first guiding structure is disposed at the housing 110. A direction of the first guiding structure is parallel to the first interface 130. The second guiding structure 260 is disposed at the interaction device 20. The second guiding structure 260 is detachably con-nected to the first guiding structure. A direction of the second guiding structure 260 is parallel to the second interface 210.

In some embodiments, the direction of the first guiding structure is approximately parallel to the first interface 130. The direction of the second guiding structure 260 is approxi-mately parallel to the second interface 210. Approximately parallel refers to that the extension direction of one of the two structures is slightly inclined relative to the extension direction of the other structure. One of the first guiding structure and the second guiding structure 260 is a plug-in post as shown in FIG. 3D. Another one of the first guiding structure and the second guiding structure 260 is a plug-in slot adapted to the plug-in post. Another one of the first guiding structure and the second guiding structure 260 may be a card slot or a hook. It can be understood that the structural member provided with the second interface 210 is provided with the second guiding structure 260, so that when the structural member is connected to the housing 110, the first guiding structure and the second guiding structure 260 are cooperated to perform a guiding function.

To achieve a more stable connection between the housing 110 and the interaction device 20 more stable, a first magnetic attraction piece and a second magnetic attraction piece may be provided at the housing 110 and the interaction device 20, respectively. When the housing 110 and the interaction device are connected to each other, the first magnetic attraction piece and the second magnetic attraction piece are magnetically attracted.

The cooperation of the first guiding structure and the second guiding structure 260 can achieve a higher efficiency of the connection between the second interface of the interaction device and the first interface of the housing.

In some embodiments, the interaction device 20 may include a processing device. The processing device is used to process data obtained from the second interface 210 and/or data obtained from one or more interaction members. For example, the first interface 130 of the display system 100 is connected to the support member 220. The support member 220 is connected to the first interaction member 230. The first interaction member 230 is a speaker. The processing device processes the data obtained by the first interaction member 230 from the second interface 210.

In some embodiments, the processing device includes a first processor. The interaction member includes the first interaction member 230 and the second interaction member 240. The first interaction member 230 includes the first processor. The first processor is used for processing first interaction data of the first interaction member 230 and second interaction data of the second interaction member 240.

The first processor can simultaneously process at least part of the first interaction data of the first interaction member 230 and at least part of the second interaction data of the second interaction member 240, to reduce a number of processors and reduce the manufacture cost.

In some embodiments, the processing device further includes a second processor and a third processor. The second processor is used for processing the second interaction data. The third processor is used for processing third interaction data. The interaction device 20 includes the first interaction member 230 and the second interaction member 240. The first interaction member 230 includes the second processor. The second interaction member 240 includes the third processor.

The second processor can process at least the data obtained by the first interaction member 230. The third processor can process at least the data obtained by the second interaction member 240. The data that can be processed by the second processor and the first processor may be partially the same or different, which may be set according to specific requirements.

It should be noted that the two detachably connected interfaces may include a USB male socket and a female header, respectively. For example, one of the first interface 130 and the second interface 210 is a USB male socket, and the other one is a female socket.

Figure 11A:
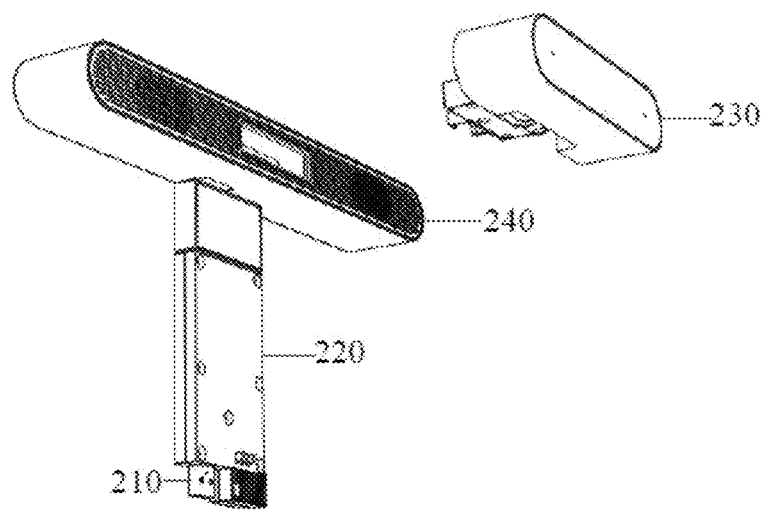
FIG. 11A is a partial exploded schematic diagram of a display system according to an embodiment of the disclosure.
Figure 11B:
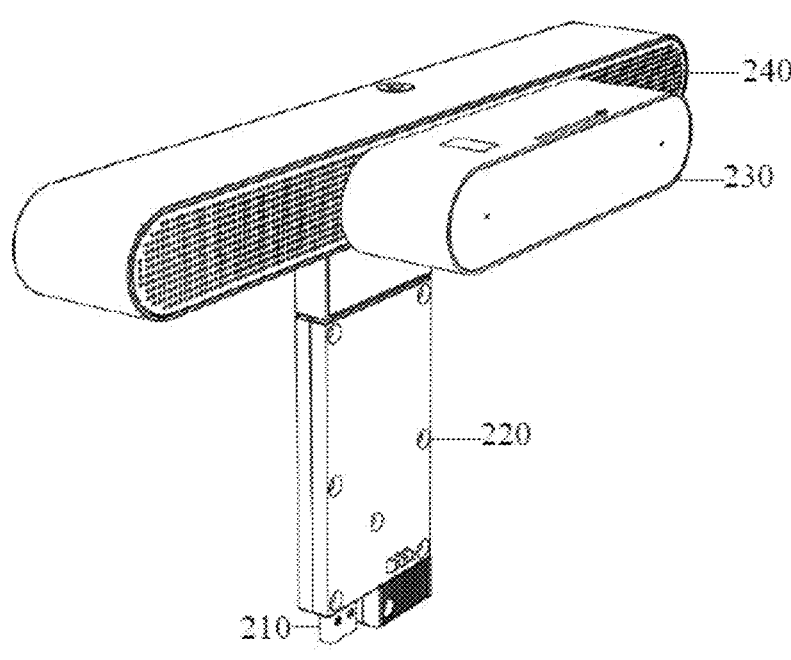
FIG. 11B is a partial assembled schematic diagram of the display system according to the embodiment of the disclosure.
Figure 11C:
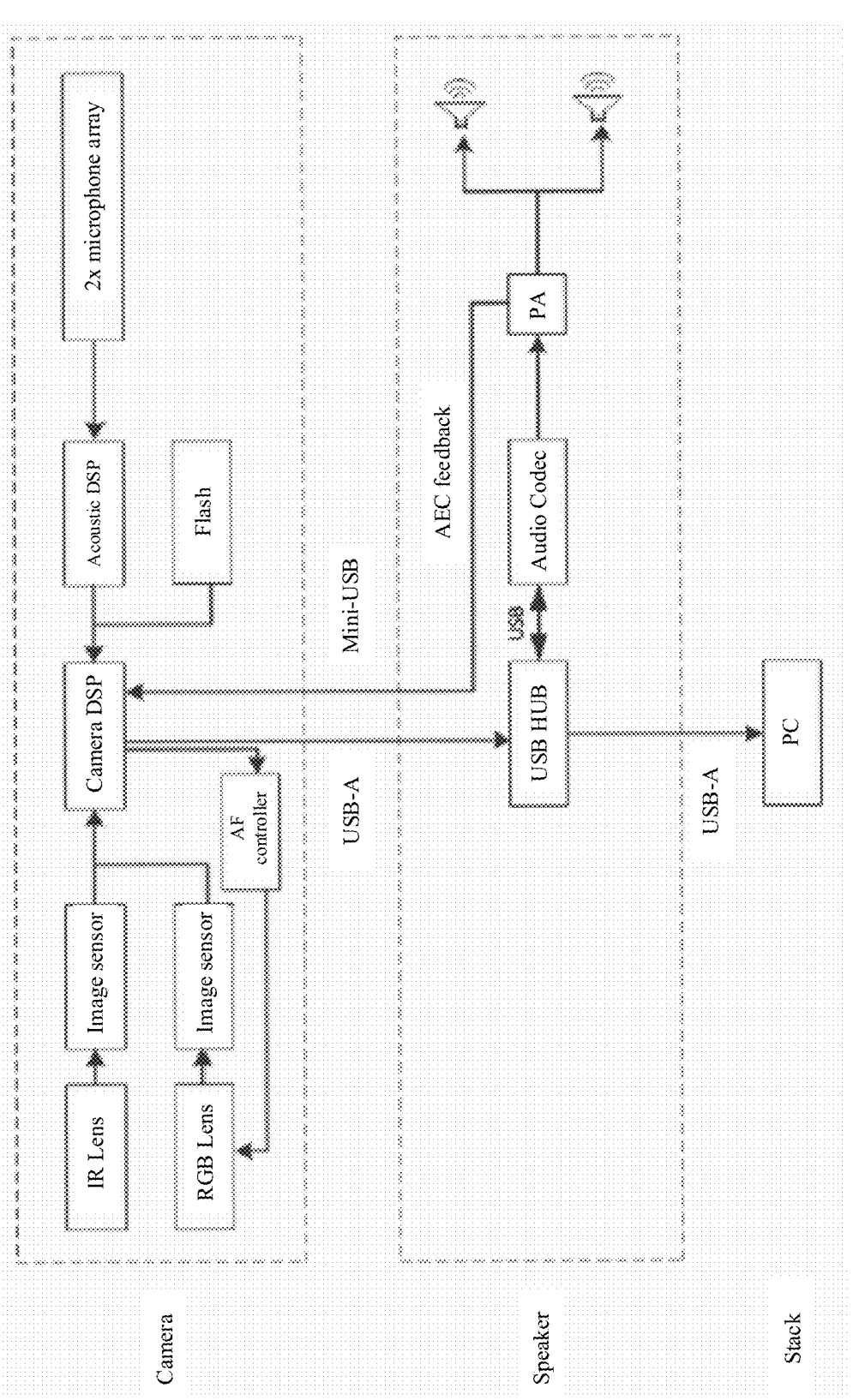
FIG. 11C is a schematic diagram of the connection of the internal structure of the display system according to the embodiment of the disclosure.

As shown in FIGS. 11A-11C, the display system 100 of a personal computer (PC) includes a housing 110, a display device 120, a support member 220, a second interaction member 240 (speaker), and a first interaction member 230 (camera). The housing 110 has a first side and a second side opposite to the first side. The display device 120 is disposed in the housing 110 and exposed from the first side of the housing 110. The second side of the housing 110 is provided with a protrusion structure 140. The protrusion structure is provided with a heat dissipation member inside the protrusion structure 140. An outer upper surface of the protrusion structure 140 is provided with a first interface 130 and a reserved interface. The support device 220 is provided with a second interface 210, an interface capable of connecting to the first interaction member 230, and an interface capable of connecting to the second interaction member 240. The second interaction member 240 is provided with an interface for connecting the first interaction member 230.

The second interaction member 240 is provided with a multi-interface (USB HUB), an audio encoder (Audio Codec) connected to the multi-interface, a player (PA) connected to the audio encoder, and a noise reduction member. The multi-interface (USB HUB) is used to adapt to different first interaction members 230. The audio encoder is used to decode an audio received by the multi-interface to enable the player connected with the audio encoder to play the decoded audio. The noise reduction member is connected to the player to eliminate echo or background sound.

The first interaction member 230 is provided with an infrared lens (IR lens), an image sensor connected to the infrared lens, a multi-color lens (RGB lens), an image sensor connected to the multi-color lens, an auto focus chip (AF controller), an image processor (Camera DSP), an audio processor (Acoustic DSP), a microphone (2× Microphone Arra), and a memory (Flash). The image processor is a first processor. The image sensor connected to the infrared lens and the image sensor connected to the multi-color lens are all connected to the image processor. The auto focus chip is respectively connected with the image processor and the multi-color lens. The microphone is connected to the image processor through the audio processor. The memory is connected to the image processor. The audio processor is used to perform audio processing on the audio received by the microphone and send a processing result to the image processor. The memory is at least used for storing attribute information of the infrared lens or the multi-color lens.

After the first interaction member 230 is connected to the second interaction member 240, the image processor is connected to the multi-interface. The image processor of the first interaction member 230 can process the image collected by the IR lens or the RGB lens, and can also process audio signal of the audio processor.

In some embodiments, the first interaction member can be connected to the reserved interface to cause the display device to have the imaging function. The second interaction member can be connected to the reserved interface to cause the display device to have the speaker function. The support member, the second interaction member, and the first interaction member may be connected in sequence from bottom to top to form a stack connection, to cause the display device to be extended with both the imaging function and the speaker function. The first interaction member and the second interaction member may be respectively connected to the support member to form a stack connection to cause the display device to be expanded with the imaging function and the speaker function, so as to meet the needs of the user in different scenarios.

The infrared lens and the multi-color lens can be located at two front sides of the first interaction member 230, respectively, and exposed from the front sides, respectively. The player can be connected to two speakers. The two speakers are arranged at two sides of the second interaction member 240, respectively. Sound outlet holes of the two speakers face upward or forward. The first interface 130 and the reserved interface may not be at a same height. For example, the reserved interface is arranged at an outer upper surface of the protrusion structure 140. The second interface 210 of the support member 220 and the first interface 130 can be a USB A or USB C interface. The first interaction member 230 and the second interaction member 240 can be connected to the support member 220 via a micro-USB B, a USB A, a USB C, or a pogo pin, respectively.

In some embodiments, because the image processor can process the audio received by the microphone, there is no audio processor. The microphone is connected to the image processor.

As shown in FIGS. 11A-11C, the display system 100 of the personal computer (PC) includes the housing 110, the display device 120, the support member 220, the second interaction member 240 (speaker), and the first interaction member 230 (camera). The housing 110 has the first side and the second side opposite to the first side. The display device 120 is disposed in the housing 110 and exposed from the first side of the housing 110. The second side of the housing 110 is provided with the protrusion structure 140. The protrusion structure is provided with a heat dissipation member inside the protrusion structure 140. The outer upper surface of the protrusion structure 140 is provided with the first interface 130 and a reserved interface. The support device 220 is provided with the second interface 210, the interface capable of connecting to the first interaction member 230, and the interface capable of connecting to the second interaction member 240. The second interaction member 240 is provided with the interface for connecting to the first interaction member 230.

The second interaction member 240 is provided with the multi-interface (USB HUB), the audio encoder (Audio Codec) connected to the multi-interface, the player (PA) connected to the audio encoder. The multi-interface (USB HUB) is used to adapt to different first interaction members 230. The audio encoder is used to decode an audio received by the multi-interface to enable the player connected with the audio encoder to play the decoded audio.

The first interaction member 230 is provided with the infrared lens (IR lens), the image sensor connected to the infrared lens, the multi-color lens (RGB lens), the image sensor connected to the multi-color lens, an auto focus chip (AF controller), the image processor (Camera DSP), the audio processor (Acoustic DSP), the microphone (2× Microphone Arra), and the memory (Flash). The image sensor connected to the infrared lens and the image sensor connected to the multi-color lens are all connected to the image processor. The auto focus chip is respectively connected with the image processor and the multi-color lens. The microphone is connected to the image processor through the audio processor. The memory is connected to the image processor. The audio processor is used to perform audio processing on the audio received by the microphone. The memory is at least used for storing attribute information of the infrared lens or the multi-color lens.

A definition of the interface spring pin (pin) at the connection between the first interaction member 230 and the second interaction member 240 includes a special definition. Pin7 and pin8 are specifically defined as a left echo/background sound elimination channel and a right echo/background sound elimination channel. After the first interaction member 230 is connected to the second interaction member 240, the image processor is connected to the multi-interface. The player is connected to the image processor. The audio signal of the player can be transmitted to the image processor to enable the image processor to perform echo/background sound elimination process. That is, the image processor in the first interaction member 230 can process the image collected by the IR lens and/or the RGB lens, process the audio signal of the audio processor, and perform echo/background sound elimination process for the second interaction member 240, thereby eliminating the need to set up the noise reduction member in the second interaction member 240, saving the cost, and causing the first interaction member 230 to obtain the audio collected by the microphone more clearly.

In some embodiments, the first interaction member can be connected to the reserved interface to cause the display device to have the imaging function. The second interaction member can be connected to the reserved interface to cause the display device to have the speaker function. The support member, the second interaction member, and the first interaction member may be connected in sequence from bottom to top to form a stack connection, to cause the display device to be extended with both the imaging function and the speaker function. The first interaction member and the second interaction member may be respectively connected to the support member to form a stack connection to cause the display device to be expanded with the imaging function and the speaker function, so as to meet the needs of the user in different scenarios.

The infrared lens and the multi-color lens can be located at two front sides of the first interaction member 230, respectively, and exposed from the front sides, respectively. The player can be connected to two speakers. The two speakers are arranged at two sides of the second interaction member 240, respectively. Sound outlet holes of the two speakers face upward or forward. The first interface 130 and the reserved interface may not be at a same height. For example, the reserved interface is arranged at an outer upper surface of the protrusion structure 140. The second interface 210 of the support member 220 and the first interface 130 can be a USB A or USB C interface. The first interaction member 230 and the second interaction member 240 can be connected to the support member 220 via a micro-USB B, a USB A, a USB C, or a pogo pin, respectively.

In some embodiments, because the image processor can process the audio received by the microphone, there is no audio processor, and the microphone is connected to the image processor.

It should be noted that, the first interaction member 230 may include a second processor. The second interaction member 240 may include a third processor.

The terms "first" and "second" are used for descriptive purposes only and should not be understood as indicating or implying relative importance or implicitly indicating the number of technical features indicated. Thus, a feature described with "first" or "second" may include one or more of such feature explicitly or implicitly. In the description of the present disclosure, "multiple" or "plurality of" means two or more, unless otherwise specified.

In the description of the present disclosure, unless otherwise defined and specified, the term "mount," "connect" and "communication" should be understood broadly. For example, a connection may be a fixed connection or a detachable connection, or a whole; it may be a mechanical connection, or may be an electrical connection, or may be a communication with each other; it may be a direct connection, or may be an indirect connection via an intermediate medium, or may be an internal connection of two members or the interaction between two members. For persons of ordinary skill in the art, the specific meaning of the above terms in the present disclosure can be understood according to the specific circumstances.

As used herein, when a first member is referred to as "fixed to" a second member, it is intended that the first member may be directly attached to the second member or may be indirectly attached to the second member via another member. When a first member is referred to as "connecting" to a second member, it is intended that the first member may be directly connected to the second member or may be indirectly connected to the second member via a third member between them. The terms "perpendicular," "horizontal," "left," "right," and similar expressions used herein are merely intended for description.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the application being indicated by the following claims.

What is claimed is:

1. A display system comprising:
a housing;
a display device provided at the housing and exposed from a first side of the housing;
a first interface provided at a second side of the housing different from the first side of the housing, and configured to transmit data; and
an interaction device including:
 a first interaction member configured to respond to or generate first interaction data, the first interaction member having a first function;
 a second interaction member having a second function different from the first function; and
 a second interface configured to be detachably connected to the first interface and transmit the data;
wherein:
 the first interaction member is directly and detachably connected to the second interaction member;
 after the second interface is connected to the first interface, the interaction device is configured to maintain a positional relationship with the display device;
 the first interaction member includes a processor; and
 the processor is configured to process second interaction data of the second interaction member.

2. The display system of claim 1, wherein:
the second side of the housing is opposite to the first side of the housing;
the display device is configured to display content toward a first direction;
the first interface is oriented in a second direction, the second direction being perpendicular to the first direction; and
the first interaction member is not overlapped with the display device in the first direction.

3. The display system of claim 2, wherein:
the interaction device further includes a support member provided with the second interface and a third interface; and
the first interaction member is provided with a fourth interface, the fourth interface being configured to be detachably connected to the third interface.

4. The display system of claim 3, wherein the support member includes a retractable structure.

5. The display system of claim 2, wherein
the first interaction member is further provided with a fifth interface;
the second interaction member is provided with a sixth interface, the sixth interface being configured to be detachably connected to the fifth interface; and
the second interaction member is not overlapped with the display device in the first direction.

6. The display system of claim 2, wherein the interaction device further includes:
a support member configured to adjust a distance between the first interaction member and the first interface in the second direction.

7. The display system of claim 6, wherein:
the support member is provided with a seventh interface; and
the second interaction member is provided with the second interface and an eighth interface, the eighth interface being configured to be detachably connected to the seventh interface.

8. The display system of claim 2, wherein an orthographic projection of the first interaction member along the first direction is not overlapped with the orthographic projection of the display device along the first direction.

9. The display system of claim 1, wherein:
the interaction device further includes a support member provided with a ninth interface;
the first interaction member is provided with a tenth interface, the tenth interface being configured to be detachably connected to the ninth interface to cause the first interaction member to be detachably connected with the support member;
the second interaction member provided with an eleventh interface and a twelfth interface, the eleventh interface being configured to be detachably connected to the ninth interface to cause the second interaction member to be detachably connected with the support member, and the twelfth interface being configured to be detachably connected to the tenth interface to cause the second interaction member to be detachably connected with the first interaction member.

10. The display system of claim 1, further comprising:
a first guiding structure provided at the housing, a direction of the first guiding structure being parallel to the first interface; and
a second guiding structure provided at the interaction device, the second guiding structure being detachably connected to the first guiding structure, and a direction of the second guiding structure being parallel to the second interface.

11. The display system of claim 1, wherein the processor is further configured to process the data obtained from the second interface or the first interaction data obtained from the first interaction member.

12. The display system of claim 1, wherein the first interaction member includes at least one of a camera, a speaker, an earphone, a microphone, a printer, a fan, or a lighting assembly.

13. The display system of claim 1, wherein:
the first interface includes at least one of a micro-USB, a USB-A interface, a USB-C interface, or a pogo pin; or
the second interface includes at least one of a micro-USB, a USB-A interface, a USB-C interface, or a pogo pin.

14. The display system of claim 1, wherein the first interface is disposed at a protrusion structure at the second side of the housing.

15. The display system of claim 14, wherein the protrusion structure is provided with a heat dissipation member for cooling the display system in the protrusion structure.

16. The display system of claim 1, wherein the second interaction data of the second interaction member includes at least data for elimination of echo or background sound.

17. The display system of claim 1, wherein the second interaction member includes a multi-interface configured to enable connection between the first interaction member and the second interaction member, connection between the first interface and the second interface, and the second function of the second interaction member.

18. A display system comprising:

a housing;

a display device provided at the housing and exposed from a first side of the housing;

a first interface provided at a second side of the housing different from the first side of the housing, and configured to transmit data; and an interaction device including:

a support member provided with:

a second interface configured to be detachably connected to the first interface; and a ninth interface;

a first interaction member configured to respond to or generate interaction data, the first interaction member being provided with a tenth interface; and a second interaction member provided with:

an eleventh interface configured to be detachably connected to the ninth interface to cause the second interaction member to be detachably connected to the support member; and a twelfth interface configured to be detachably connected to the tenth interface to cause the second interaction member to be detachably connected to the first interaction member;

wherein, after the second interface is connected to the first interface, the interaction device is configured to maintain a positional relationship with the display device.

19. A display system comprising:

a housing;

a display device provided at the housing and exposed from a first side of the housing;

a first interface provided at a second side of the housing different from the first side of the housing, and configured to transmit data; and an interaction device including:

a support member provided with:

a second interface configured to be detachably connected to the first interface; and a ninth interface;

a first interaction member configured to respond to or generate interaction data, the first interaction member being provided with a tenth interface configured to be detachably connected to the ninth interface to cause the first interaction member to be detachably connected with the support member; and a second interaction member provided with:

an eleventh interface configured to be detachably connected to the ninth interface to cause the second interaction member to be detachably connected to the support member; and a twelfth interface configured to be detachably connected to the tenth interface to cause the second interaction member to be detachably connected to the first interaction member;

wherein:

after the second interface is connected to the first interface, the interaction device is configured to maintain a positional relationship with the display device;

the second side of the housing is opposite to the first side of the housing;

the display device is configured to display content toward a first direction;

the first interface is oriented in a second direction, the second direction being perpendicular to the first direction; and the interaction member is not overlapped with the display device in the first direction.

* * * * *